US010360504B2

(12) United States Patent
Helfman et al.

(10) Patent No.: US 10,360,504 B2
(45) Date of Patent: *Jul. 23, 2019

(54) GENERALIZED FACETED BROWSER DECISION SUPPORT TOOL

(71) Applicant: Oracle International Corporation, Redwood Shores, CA (US)

(72) Inventors: Jonathan Helfman, Half Moon Bay, CA (US); Brent-Kaan William White, San Francisco, CA (US)

(73) Assignee: OrACLE INTERNATIONAL CORPORATION, Redwood Shores, CA (US)

( * ) Notice: Subject to any disclaimer, the term of this patent is extended or adjusted under 35 U.S.C. 154(b) by 184 days.

This patent is subject to a terminal disclaimer.

(21) Appl. No.: 15/203,578

(22) Filed: Jul. 6, 2016

(65) Prior Publication Data

US 2016/0342897 A1 Nov. 24, 2016

Related U.S. Application Data

(63) Continuation of application No. 11/681,986, filed on Mar. 5, 2007, now Pat. No. 9,411,903.

(51) Int. Cl.
G06F 3/0482 (2013.01)
G06F 16/34 (2019.01)
(Continued)

(52) U.S. Cl.
CPC ........... *G06N 5/022* (2013.01); *G06F 3/0482* (2013.01); *G06F 3/04817* (2013.01);
(Continued)

(58) Field of Classification Search
CPC ............ G06F 3/0482; G06F 17/30873; G06F 17/30398; G06F 17/30716;
(Continued)

(56) References Cited

U.S. PATENT DOCUMENTS 5,461,708 A 10/1995 Kahn
5,537,630 A 7/1996 Berry et al.
(Continued)

OTHER PUBLICATIONS

Bertin, Semiology of Graphics, Diagrams Networks Maps, Univ. of Wisconsin Press, 1983, pp. 15-283.
(Continued)

*Primary Examiner* — Amy Ng
*Assistant Examiner* — William Wong
(74) *Attorney, Agent, or Firm* — Kilpatrick Townsend & Stockton LLP

(57) ABSTRACT

Embodiments of the present invention provide a faceted browser for decision-making that enables interactive visualization of a decision space as choices are made. According to one embodiment, a computer-implemented method comprises receiving a selection of a first choice from a user. The first choice is displayed in a user interface that includes a plurality of facets, each facet including a plurality of choices. The method further comprises disabling at least one second choice in response to the selection of the first choice, and determining a first result set in response to the selection of the first choice. The user interface is then updated in real-time to display the selected status of the first choice, the disabled status of the second choice, and the first result set to the user.

20 Claims, 11 Drawing Sheets

(51) Int. Cl.
*G06N 5/02* (2006.01)
*G06F 16/957* (2019.01)
*G06F 16/332* (2019.01)
*G06F 17/24* (2006.01)
*G06F 3/0481* (2013.01)
*G06F 3/0484* (2013.01)

(52) U.S. Cl.
CPC ...... *G06F 3/04842* (2013.01); *G06F 16/3323* (2019.01); *G06F 16/34* (2019.01); *G06F 16/957* (2019.01); *G06F 17/246* (2013.01)

(58) Field of Classification Search
CPC ......... G06F 17/30899; G06F 17/30643; G06F 17/246; G06F 3/04817; G06F 3/04842; G06F 16/34; G06F 16/957; G06F 16/3323; G06N 5/022
See application file for complete search history.

(56) References Cited

U.S. PATENT DOCUMENTS

| | | | |
|---|---|---|---|
| 5,550,964 | A | 8/1996 | Davoust |
| 5,557,716 | A | 9/1996 | Oka et al. |
| 5,581,677 | A | 12/1996 | Myers et al. |
| 5,581,678 | A | 12/1996 | Kahn |
| 5,611,034 | A | 3/1997 | Makita |
| 5,630,148 | A | 5/1997 | Norris |
| 5,713,031 | A | 1/1998 | Saito |
| 5,768,581 | A | 6/1998 | Cochran |
| 5,774,118 | A | 6/1998 | Hatakama |
| 5,818,437 | A | 10/1998 | Grover et al. |
| 5,844,558 | A | 12/1998 | Kumar et al. |
| 5,924,090 | A | 7/1999 | Krellenstein |
| 6,005,601 | A | 12/1999 | Ohkura et al. |
| 6,031,535 | A | 2/2000 | Barton |
| 6,032,145 | A | 2/2000 | Beall et al. |
| 6,067,087 | A | 5/2000 | Krauss et al. |
| 6,067,552 | A | 5/2000 | Yu |
| 6,112,201 | A | 8/2000 | Wical |
| 6,160,536 | A | 12/2000 | Forest |
| 6,353,452 | B1 | 3/2002 | Hamada et al. |
| 6,381,611 | B1 | 4/2002 | Roberge et al. |
| 6,401,084 | B1 | 6/2002 | Ortega et al. |
| 6,456,304 | B1 | 9/2002 | Angiulo et al. |
| 6,476,828 | B1 | 11/2002 | Burkett et al. |
| 6,535,229 | B1 | 3/2003 | Kraft |
| 6,741,270 | B1 | 5/2004 | Rzepkowski et al. |
| 6,745,140 | B2 | 6/2004 | Sutton |
| 6,795,097 | B1 | 9/2004 | Yamaguchi et al. |
| 6,816,965 | B1 | 11/2004 | Moore et al. |
| 6,826,552 | B1 | 11/2004 | Grosser et al. |
| 6,850,259 | B1 | 2/2005 | Rzepkowski et al. |
| 6,871,198 | B2 | 3/2005 | Neal et al. |
| 6,920,448 | B2 | 7/2005 | Kincaid et al. |
| 6,972,763 | B1 | 12/2005 | Millett et al. |
| 6,973,450 | B1 | 12/2005 | Silverbrook et al. |
| 6,995,768 | B2 | 2/2006 | Jou et al. |
| 7,002,580 | B1 | 2/2006 | Aggala et al. |
| 7,069,261 | B2 | 6/2006 | Ahl et al. |
| 7,071,940 | B2 | 7/2006 | Malik |
| 7,120,646 | B2 | 10/2006 | Streepy, Jr. |
| 7,130,846 | B2 | 10/2006 | Danker et al. |
| 7,149,983 | B1 | 12/2006 | Robertson et al. |
| 7,155,439 | B2 | 12/2006 | Cope |
| 7,185,001 | B1 | 2/2007 | Burdick et al. |
| 7,191,410 | B1 | 3/2007 | Kruempelmann et al. |
| 7,233,940 | B2 | 6/2007 | Bamberger et al. |
| 7,392,326 | B2 | 6/2008 | Vale |
| 7,395,511 | B1 | 7/2008 | Robertson et al. |
| 7,467,354 | B2 | 12/2008 | Barry et al. |
| 7,478,151 | B1 | 1/2009 | Maiocco et al. |
| 7,603,367 | B1 | 10/2009 | Kanter et al. |
| 7,624,355 | B2 | 11/2009 | Baneth |
| 2001/0047355 | A1 | 11/2001 | Anwar |
| 2001/0049677 | A1 | 12/2001 | Talib et al. |
| 2002/0023057 | A1 | 2/2002 | Goodwin et al. |
| 2002/0042795 | A1* | 4/2002 | Smith ............... G06F 17/30067 |
| 2002/0051020 | A1 | 5/2002 | Ferrari et al. |
| 2002/0080187 | A1 | 6/2002 | Lawton |
| 2002/0083039 | A1 | 6/2002 | Ferrari et al. |
| 2002/0087441 | A1 | 7/2002 | Wagner, Jr. et al. |
| 2002/0087561 | A1 | 7/2002 | Ching Chen et al. |
| 2002/0091661 | A1 | 7/2002 | Anick et al. |
| 2002/0169675 | A1 | 11/2002 | Helot et al. |
| 2003/0061196 | A1 | 3/2003 | Hirasawa et al. |
| 2003/0076336 | A1 | 4/2003 | Fukao et al. |
| 2003/0140040 | A1 | 7/2003 | Schiller |
| 2003/0177143 | A1 | 9/2003 | Gardner |
| 2003/0187823 | A1 | 10/2003 | Ahl et al. |
| 2004/0032432 | A1 | 2/2004 | Baynger |
| 2004/0044661 | A1 | 3/2004 | Allen et al. |
| 2004/0064447 | A1 | 4/2004 | Simske et al. |
| 2004/0076177 | A1 | 4/2004 | Koch et al. |
| 2004/0078231 | A1 | 4/2004 | Wilkes et al. |
| 2004/0080545 | A1 | 4/2004 | Kobal et al. |
| 2004/0117358 | A1 | 6/2004 | Von Kaenel et al. |
| 2004/0128546 | A1 | 7/2004 | Blakley, III et al. |
| 2004/0133413 | A1 | 7/2004 | Beringer et al. |
| 2004/0177069 | A1 | 9/2004 | Li et al. |
| 2004/0181516 | A1 | 9/2004 | Ellwanger et al. |
| 2004/0196316 | A1 | 10/2004 | Handy Bosma et al. |
| 2005/0010872 | A1 | 1/2005 | Lee et al. |
| 2005/0044100 | A1 | 2/2005 | Hooper et al. |
| 2005/0065955 | A1 | 3/2005 | Babikov et al. |
| 2005/0071780 | A1 | 3/2005 | Muller et al. |
| 2005/0125744 | A1 | 6/2005 | Hubbard et al. |
| 2005/0131945 | A1 | 6/2005 | Muller et al. |
| 2005/0144162 | A1 | 6/2005 | Liang |
| 2005/0179929 | A1 | 8/2005 | Jain |
| 2005/0187925 | A1 | 8/2005 | Schechinger et al. |
| 2005/0268247 | A1 | 12/2005 | Baneth |
| 2006/0026145 | A1 | 2/2006 | Beringer et al. |
| 2006/0036949 | A1 | 2/2006 | Moore et al. |
| 2006/0047649 | A1 | 3/2006 | Liang |
| 2006/0080335 | A1 | 4/2006 | Freeborg et al. |
| 2006/0085766 | A1 | 4/2006 | Dominowska et al. |
| 2006/0106793 | A1 | 5/2006 | Liang |
| 2006/0167942 | A1 | 7/2006 | Lucas et al. |
| 2006/0224960 | A1 | 10/2006 | Baird-Smith |
| 2006/0271565 | A1 | 11/2006 | Acevedo-aviles et al. |
| 2006/0271876 | A1 | 11/2006 | Holmes et al. |
| 2007/0011081 | A1 | 1/2007 | Bok et al. |
| 2007/0050720 | A1 | 3/2007 | Sharp et al. |
| 2007/0073625 | A1 | 3/2007 | Shelton |
| 2007/0074130 | A1 | 3/2007 | Folting et al. |
| 2007/0106658 | A1 | 5/2007 | Ferrari et al. |
| 2007/0185836 | A1 | 8/2007 | Handy-Bosma et al. |
| 2007/0192310 | A1 | 8/2007 | Takagi et al. |
| 2007/0219960 | A1 | 9/2007 | Vadon et al. |
| 2007/0219983 | A1 | 9/2007 | Fish |
| 2007/0229903 | A1 | 10/2007 | Sato |
| 2007/0233654 | A1 | 10/2007 | Karlson et al. |
| 2007/0233738 | A1 | 10/2007 | Weinberger et al. |
| 2007/0255745 | A1 | 11/2007 | Gargi |
| 2007/0283259 | A1 | 12/2007 | Barry et al. |
| 2008/0086451 | A1 | 4/2008 | Torres et al. |
| 2008/0104051 | A1 | 5/2008 | Gosper |
| 2008/0104542 | A1* | 5/2008 | Cohen ................... G06F 16/951 715/810 |
| 2008/0126982 | A1 | 5/2008 | Sadikali et al. |
| 2008/0222561 | A1 | 9/2008 | Helfman et al. |
| 2009/0024955 | A1 | 1/2009 | Barry et al. |
| 2009/0024959 | A1 | 1/2009 | Barry et al. |
| 2009/0030725 | A1 | 1/2009 | Nadas et al. |

OTHER PUBLICATIONS

Few, Information Dashboard Design, O'Reilly Media, 2006, pp. 130-139.
Gillan et al., Guidelines for Presenting Quantitative Data in HFES Publications, Human Factors, vol. 40, No. 1, Mar. 1, 1998, pp. 28-41.

(56) References Cited

OTHER PUBLICATIONS

Harris, Information Graphics: A Comprehensive Illustrated Reference, Oxford University Press, 2000, pp. 164-177.
Huynh et al., Piggy Bank: Experience the Semantic Web Inside Your Web Browser, Lecture Notes in Computer Science, vol. 3729, Oct. 2005, pp. 413-430.
Lin, Damask: A Tool for Early-Stage Design and Prototyping of Cross-Device User Interfaces, In Proceedings of the 8th International Conference on Distributed Multimedia Systems (2002 International D Workshop on Visual Computing), San Francisco, CA, Sep. 26-28, 2002, pp. 573-580.
Tarrani et al., Tools for IT Professionals and Consultants—How to Select a Chart Type that Best Displays Your Numerical or Statistical Data, www.geocities.com/TechCommLCZ/ChartSelection.pdf (Internet Archive), Dec. 21, 2004.
U.S. Appl. No. 11/681,986, Advisory Action dated Mar. 29, 2010, 3 pages.
U.S. Appl. No. 11/681,986, Final Office Action dated Jun. 5, 2013, 14 pages.
U.S. Appl. No. 11/681,986, Final Office Action dated Aug. 31, 2011, 14 pages.
U.S. Appl. No. 11/681,986, Final Office Action dated Dec. 30, 2009, 16 pages.
U.S. Appl. No. 11/681,986, Final Office Action dated Jul. 17, 2014, 16 pages.
U.S. Appl. No. 11/681,986, Non-Final Office Action dated Dec. 3, 2013, 14 pages.
U.S. Appl. No. 11/681,986, Non-Final Office Action dated Sep. 30, 2010, 14 pages.
U.S. Appl. No. 11/681,986, Non-Final Office Action dated Mar. 15, 2011, 15 pages.
U.S. Appl. No. 11/681,986, Non-Final Office Action dated Sep. 24, 2015, 17 pages.
U.S. Appl. No. 11/681,986, Non-Final Office Action dated Jun. 24, 2009, 19 pages.
U.S. Appl. No. 11/681,986, Notice of Allowance dated Apr. 11, 2016, 15 pages.
U.S. Appl. No. 11/681,986, Non-Final Office Action dated Sep. 12, 2012, 13 pages.
U.S. Appl. No. 11/681,986, Non-Final Office Action dated Mar. 16, 2012, 14 pages.
U.S. Appl. No. 11/682,010, Final Office Action dated Nov. 5, 2009, 22 pages.
U.S. Appl. No. 11/682,010, Non-Final Office Action dated Jun. 3, 2009, 18 pages.
U.S. Appl. No. 11/682,010, Notice of Allowance dated Jan. 22, 2010, 15 pages.

* cited by examiner

```
{ name:'Learnability',
  attributes: ['Easy', 'Moderate', 'Hard'] },
{ name:'Raw Data Structure',
  attributes: ['Hierarchical', 'Non-Hierarchical'] },
{ name:'User Type',
  attributes: ['Experienced/Part Time', 'Casual', 'Technical Admin', 'Experienced/
Frequent'] },
{ name:'Layout Structure',
  attributes: ['Flow', 'Page', 'Partial Page', 'Pop-Up Window'] },
{ name:'User Task',
  attributes: ['Add, Import, or Export', 'Browse', 'Compare', 'Create', 'Delete', 'Identify',
'Monitor/Track', 'Analyze', 'Review & Take Action', 'Search', 'Seek More Info', 'Setup',
'Update'] },
{ name:'Key BLAF+ Component',
  attributes: ['Accordian', 'Button', 'Disclosure Icon', 'Header', 'HGrid', 'Menu',
'Secondary Window', 'Shuttle', 'Switcher', 'Table', 'Train', 'Tree', 'Toolbar', 'Treemap'] }
```

*FIG. 5A*

```
{ name:'Approve Items',
  link:'../approveitems/',
  pairs:['User Task:Review & Take Action', 'User Type:Experienced/Part Time', 'User
Type:Experienced/Frequent', 'Raw Data Structure:Non-Hierarchical', 'Layout
Structure:Page', 'Layout Structure:Partial Page', 'Learnability:Easy',
'Learnability:Moderate', 'Key BLAF+ Component:Menu']},
{ name:'Attachments',
  link:'../attachments/',
  pairs:['User Task:Add, Import, or Export', 'Layout Structure:Partial Page',
'Learnability:Easy', 'Key BLAF+ Component:Button']},
{ name:'Browse Categories & Items',
  link:'../browse/categoriesitems/',
  pairs:['User Task:Search', 'User Task:Seek More Info', 'User Task:Browse', 'Raw Data
Structure:Hierarchical', 'Layout Structure:Page', 'Learnability:Easy', 'Key BLAF+
Component:Header']}, ...
);
```

*FIG. 5B*

GENERALIZED FACETED BROWSER DECISION SUPPORT TOOL

CROSS-REFERENCES TO RELATED APPLICATIONS

The present application is a continuation of, and claims the benefit of and priority to, U.S. patent application Ser. No. 11/681,986, filed Mar. 5, 2007, the entire contents of which are incorporated herein by reference for all purposes.

BACKGROUND OF THE INVENTION

Embodiments of the present invention generally relate to decision support tools, and more particularly relate to a faceted browser for decision-making that provides interactive visualization of a decision within a complex network of sub-decisions (i.e. a "decision space") as choices are made.

Everyday, modern culture asks us to make myriad decisions. How do we decide which college to attend, which job to take, or which restaurant to eat at? We typically rank the alternatives along relevant dimensions, or facets. Each facet, in turn, includes a plurality of choices. When choosing a restaurant, for example, facets may include type of cuisine, average meal price, and distance from our home. The choices for type of cuisine may include Italian, French, Chinese, or Korean. We use our understanding of the facets to weigh high-ranking alternatives. For example, the closest restaurant may be the most expensive, but nevertheless may be the best choice if it serves the cuisine we want.

When decisions become complex, decision support tools can facilitate the decision-making process. A decision support tool is a computer-implemented system that models the groups of connected choices (i.e., facets) involved in making complex decisions as a decision space. Decision support tools help users navigate through a decision space to reach an optimal result. Each forward step is a choice that limits the number of remaining alternatives in the result set, while backtracking steps expand the number of alternatives.

A typical1 decision support tool models a decision space as a single spanning tree or hierarchy. The hierarchy is often mapped to a user interface, allowing users to make decisions by navigating the hierarchy. One example is a YELLOW PAGES telephone directory, which is a two-tier hierarchy of local businesses organized by business type and name.

A single hierarchy limits the usefulness of a decision support tool in several ways. First, users must navigate from the top of the hierarchy down to the bottom. With respect to the telephone directory, a user must select a business type and then a name; navigation in the opposite direction is not supported. Second, sufficient knowledge is needed to make choices. In particular, users must be able to understand the terminology used to label each step. Third, a single hierarchy cannot support users who may be approaching a decision from different contexts. For example, the telephone directory will not be useful to a user who only knows the location of a business.

Faceted browsers are an alternative to single-hierarchy decision support tools. Faceted browsers allow users to navigate multiple hierarchies in any order. For example, if the decision is "What graph type should I use to plot a particular series of data?" one facet may organize graph types by tasks, such as "compare trends" or "show percentages." A second facet may organize graph types by the structure of the data to be plotted, such as hierarchical or non-hierarchical. Users can start the process of selecting a graph type by choosing a task, data structure type, or any other facet. Because facets can be chosen in any order, there is a higher chance that users with a wide variety of contexts and knowledge will be able to use the decision support tool successfully. If an analyst is familiar with the data to be plotted, she might start with the data structure facet, while a usability engineer might start with the task facet.

Although faceted browsers represent an improvement in usability over single-hierarchy decision support tools, they still have usability problems. Users are still likely to encounter choices between concepts that they do not understand. When users do not understand the logical grouping for a facet or the particular terms used to label a choice, they are unable to anticipate how making that choice will affect the decision space they are traversing. In some cases making a choice may prune too much of the decision space, while in other cases it may prune too little. Additionally, a choice taken by misinterpreting its label may move the user father away from the optimal result rather than closer, perhaps making that result unattainable.

Current approaches to the above problems include using indicators (e.g., mouse-over tool-tips and text labels) to show how a particular choice might affect metrics associated with the result set (e.g., result set size and result set sub-categories). However, merely knowing the degree to which the decision space will be pruned does not convey much information about how the decision space is organized and which parts of the decision space will be pruned as a result of the choice. This information is particularly important in helping users understand the logic behind unfamiliar facets and the meaning of unfamiliar choice labels.

BRIEF SUMMARY OF THE INVENTION

Embodiments of the present invention address the foregoing problems by providing a faceted browser for decision-making that enables interactive visualization of a decision space as choices are made. In one set of embodiments, each facet of the decision space is represented as a collection of user-selectable elements (e.g., checkboxes, radio buttons, drop-down lists, etc.) in a user interface (e.g., web-based form, proprietary client application, etc.). The result set of the decision space is represented as a list of items (e.g., hyperlinks, etc.).

When a user selects a particular element corresponding to a choice, other elements corresponding to other choices may become disabled (i.e., can no longer be selected) and the result set list may be shortened. Conversely, when a user de-selects a particular element corresponding to a choice, other elements corresponding to other choices may become enabled (i.e., can be selected) and the result set list may be expanded. In this manner, the user receives immediate, interactive feedback about how a particular choice affects the result set, as well as how the choices are related.

In various embodiments, the user interface of the faceted browser may be automatically generated from one or more lists that are separate from the faceted browser logic. These lists may be stored in a textual form, such as XML, or JAVASCRIPT® object notation (JSON). This feature allows non-programmers to edit attributes of the user interface without having to change the program code of the browser. This feature also allows the faceted browser engine to be reused for a variety of different decision support scenarios without having to modify the program code. The lists may be stored together with the program code of the faceted browser or in one or more files that are separate from the program code.

In one embodiment, attributes of the user interface may be stored across a plurality of text-based lists. For example, a first list may contain facet/choice labels and the associations between facets and choices, while a second list may contain result labels, result URLs, and the associations between results and facet-choice pairs. In other embodiments, attributes of the user interface may be stored in a single list.

According to one embodiment of the present invention, a computer-implemented method for aiding a user in decision-making comprises receiving a selection of a first choice from the user. The first choice is displayed in a user interface that includes a plurality of facets, each facet including a plurality of choices. The method further comprises disabling at least one second choice in response to the selection of the first choice, and determining a first result set in response to the selection of the first choice. The user interface is then updated in real-time to display the selected status of the first choice, the disabled status of the second choice, and the first result set to the user.

According to another embodiment of the present invention, the method above further comprises receiving a selection of a third choice, disabling at least one fourth choice in response to the selection of the third choice, and determining a second result set in response to the selection of the third choice. The user interface is then updated in real-time to display the selected status of the first choice, the disabled status of the second choice, the selected status of the third choice, the disabled status of the fourth choice, and the second result set to the user.

According to yet another embodiment of the present invention, the method above further comprises receiving a de-selection of one of the first and third choices, and enabling at least one of the second and fourth choices in response to the de-selection. The user interface is then updated in real-time to display the first, second, third, and fourth choices in a current state resulting from the de-selection, along with an updated result set, to the user.

Embodiments of the present invention also include a method that comprises defining a facet label for each facet, defining a choice label for each choice, defining a result label for each result in the result set, defining associations between facets and choices, defining associations between results and facet-choice pairs, and storing all of the above in a text-based file. In one embodiment, the text-based file may be read to generate the user interface for a faceted browser.

According to another aspect of the present invention, a machine-readable medium for a computer system is disclosed. The machine-readable medium includes instructions which, when executed by a processor, cause the processor to receive a selection of a first choice from a user. The first choice is displayed in a user interface that includes a plurality of facets, each facet including a plurality of choices. The instructions further cause the processor to disable at least one second choice in response to the selection of the first choice, and determine a first result set in response to the selection of the first choice. The instructions then cause the user interface to be updated in real-time to display the selected status of the first choice, the disabled status of the second choice, and the first result set to the user.

According to a yet another aspect of the present invention, a system for aiding a user in decision-making comprises a memory component, communications interface, and a processing component. The processing component transmits a first specification of a user interface, wherein the first specification includes a plurality of facets, and wherein each facet includes a plurality of choices. The processing component receives through the user input component a selection of a first choice, disables at least one second choice in response to the selection of the first choice, and determines, by accessing the memory component, a result set in response to the selection of the first choice. The processing component then transmits, in real-time, a second specification of the user interface, wherein the second specification includes the selected status of the first choice, the disabled status of the second choice, and result set.

A further understanding of the nature and the advantages of the inventions disclosed herein may be realized by reference to the remaining portions of the specification and the attached drawings.

BRIEF DESCRIPTION OF THE DRAWINGS

Various embodiments in accordance with the present invention will be described with reference to the drawings, in which:

FIGS. 5A and 5B illustrate text-based lists that define a decision space and may be used to generate a user interface in accordance with one embodiment of the present invention;

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the present invention relate to methods, systems, and machine-readable media that allow users to interactively visualize the decision space and result set for a decision. In various embodiments, a user interface for a faceted browser is provided that displays choices (organized as facets) and a current result set to a user. As the user selects and de-selects various choices, the user interface is updated in real-time to show those results that map to the selected choices, and to disable or enable other choices in response to the selected choices. These interactive updates provide immediate feedback about how a particular choice affects the size and content of the result set, as well as how the facets and choices are related.

Figure 1:
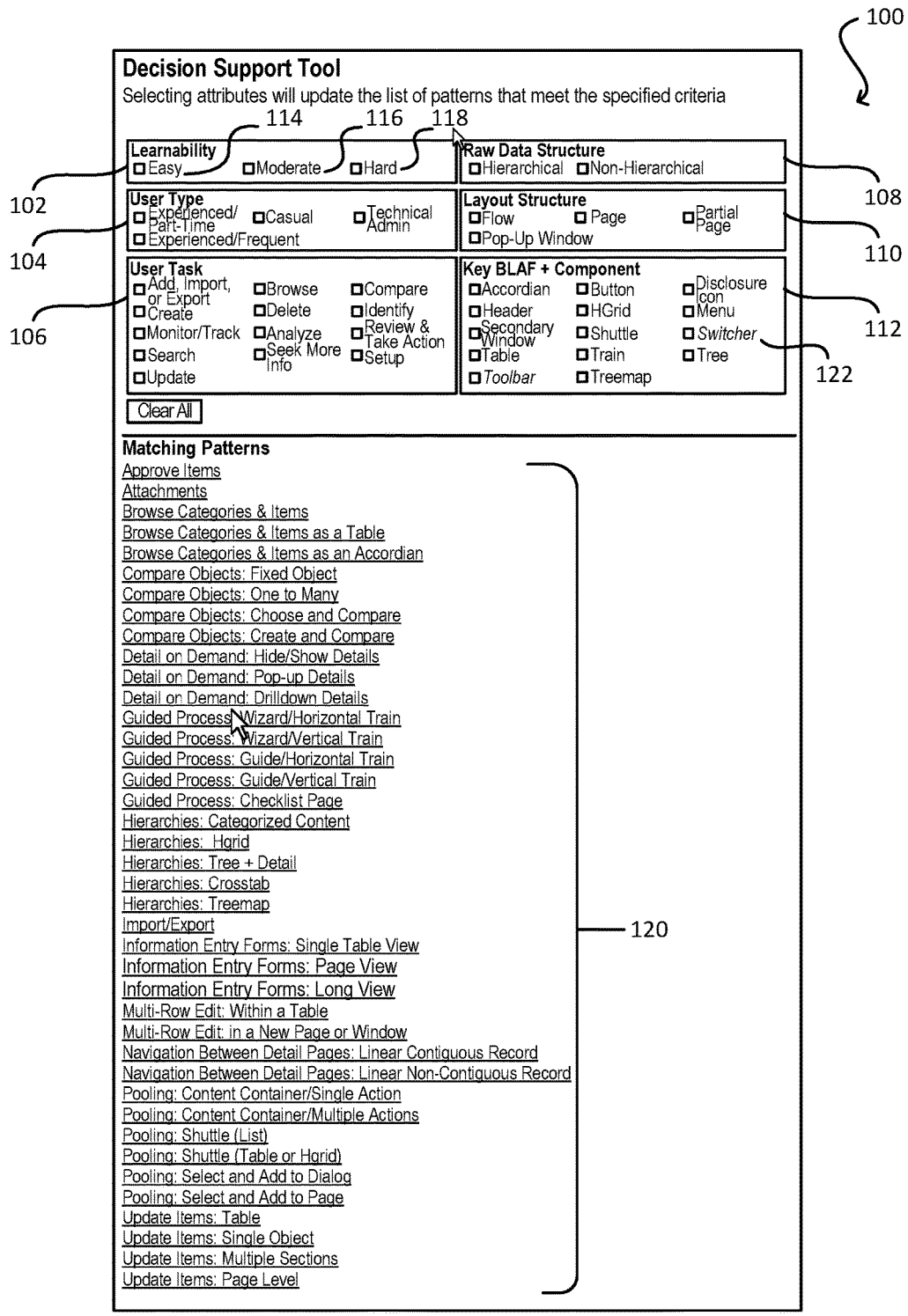
FIG. 1 illustrates a first exemplary user interface in accordance with one embodiment of the present invention.

FIG. 1 illustrates a faceted browser user interface 100 in accordance with one embodiment of the present invention. User interface 100 may be implemented as a web-based form, proprietary application window, or any other type of software interface. User interface 100 includes a plurality of facets (102, 104, 106, 108, 110, 112), and each facet includes a plurality of choices. For example, the "Learnability" facet (102) includes the choices "Easy" (114), "Moderate" (116), and "Hard" (118). As shown, each facet is represented by a collection (e.g., table) of checkbox elements, and each choice is represented by a checkbox element. Alternatively, choices may be represented by other user-selectable elements, such as radio buttons, drop-down lists, and the like.

In various embodiments, a choice may be selected or unselected/de-selected. A choice may also be enabled or disabled. These two states are independent, and thus a choice may be (1) selected and enabled, (2) selected and disabled, (3) unselected and enabled, or (4) unselected and disabled. In an exemplary embodiment, all of the choices in user interface 100 are unselected and enabled when the user interface is first presented to a user. This allows the user to begin traversing the entire decision space in whatever order he or she sees fit. In other embodiments, one or more choices may be selected and/or disabled by default when the user interface is first presented to a user. For example, choice "Switcher" (122) in FIG. 1 is disabled by default. This allows the decision space to be narrowed before the user begins interacting with browser. The determination of which choices are selected and/or disabled by default may be based on any number of criteria such as the identity of the user, the validity of results in the result set, and the like.

User interface 100 includes a result set 120 which corresponds to all of the results in the decision space that map to the currently selected choices. As shown in FIG. 1, result set 120 is displayed on the same UI page or window as the facets and choices. This arrangement allows a user to interactively visualize how the result set changes as choices are selected and de-selected. In one embodiment, result set 120 is displayed as a list of hyperlinks. In alternative embodiments, result set 120 may be displayed in other formats (e.g., plain text, images, etc.) and configurations (e.g., table, tree, etc.).

In the exemplary embodiment of FIG. 1, all of the results in the decision space are displayed when no choices are selected. Thus, FIG. 1 shows 40 results in result set 120. In other embodiments, result set 120 may be empty or hidden unless at least one choice is selected.

Figure 2:
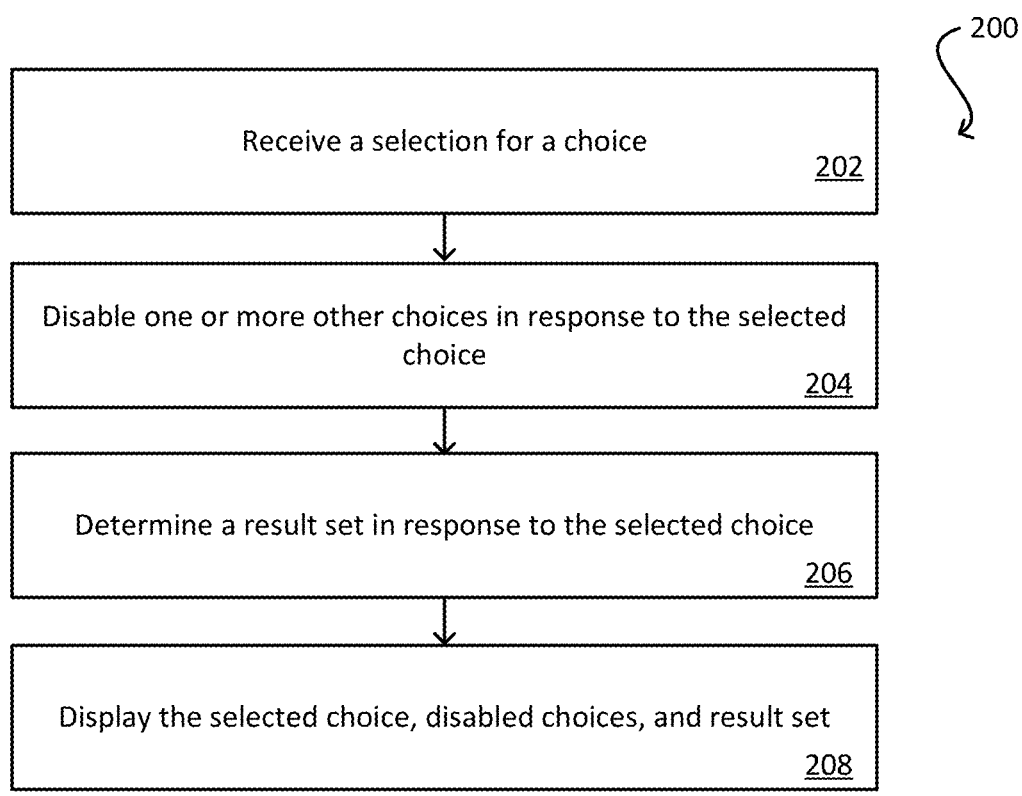
FIG. 2 illustrates the steps performed in processing a choice selection in accordance with one embodiment of the present invention.

FIG. 2 is a flowchart illustrating the steps performed in processing a choice selection. At step 202, a selection for a choice is received. At step 204, one or more other choices are disabled in response to the selected choice. A choice is typically disabled by disabling the user interface element (e.g., checkbox) associated to the choice, thereby preventing the user from selecting the disabled choice. In one set of embodiments, a choice is disabled if it cannot be used to further narrow the result set (in light of the already selected choices). Alternatively, other criteria may be used to determine which choices are disabled.

In various embodiments, a current result set is determined in response to the selected choice (206). The result set contains those results that are congruent with the selected choices. At step 208, the user interface interactively displays the selected choice, disabled choice(s), and the current result set. That is, the user interface is updated in real-time to reflect the selected state of the selected choice, the disabled state(s) of the disabled choice(s), and the size and content of the newly-determined result set.

Figure 3A:
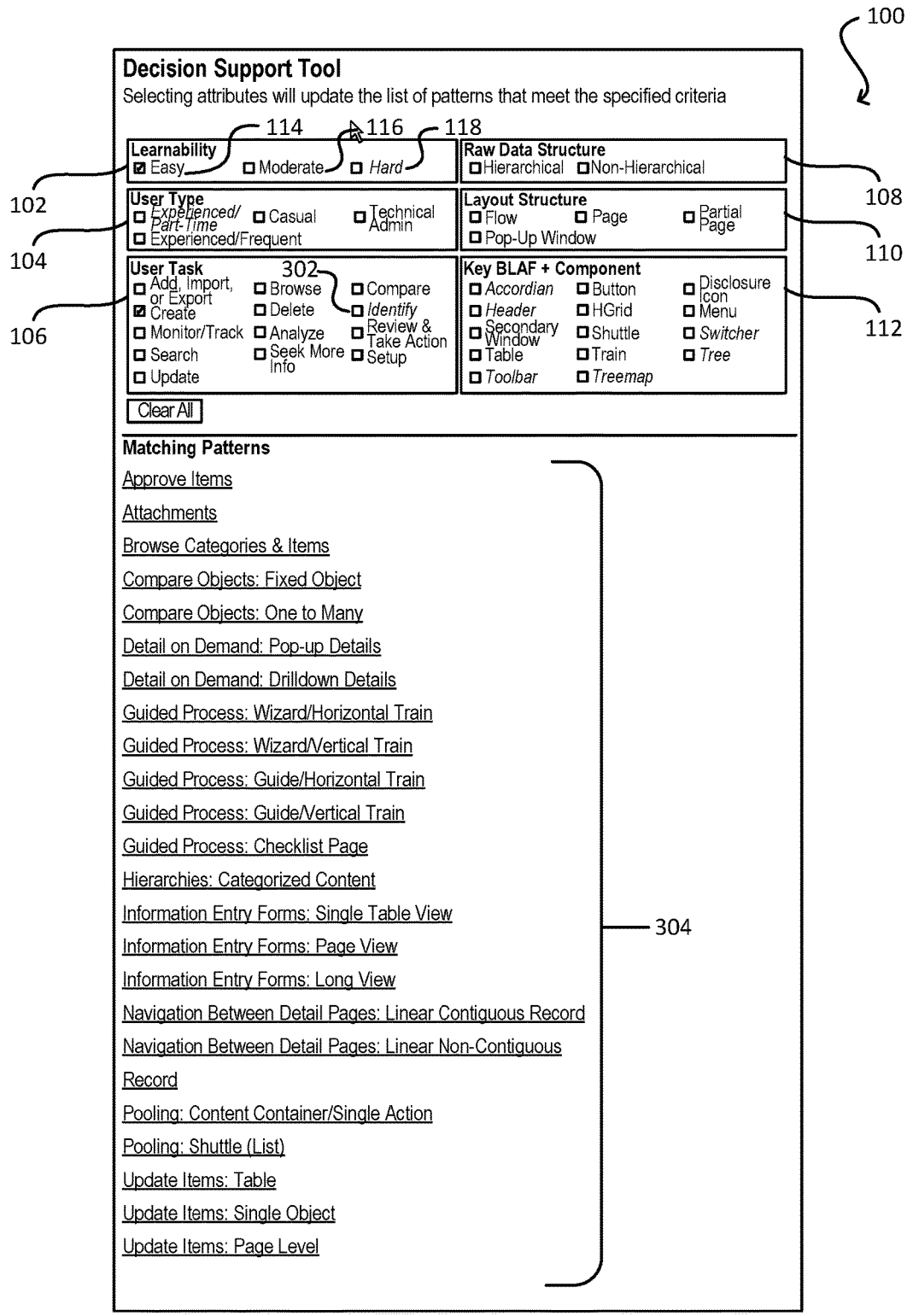
FIGS. 3A and 3B illustrate second and third exemplary user interfaces in accordance with one embodiment of the present invention.
Figure 3B:
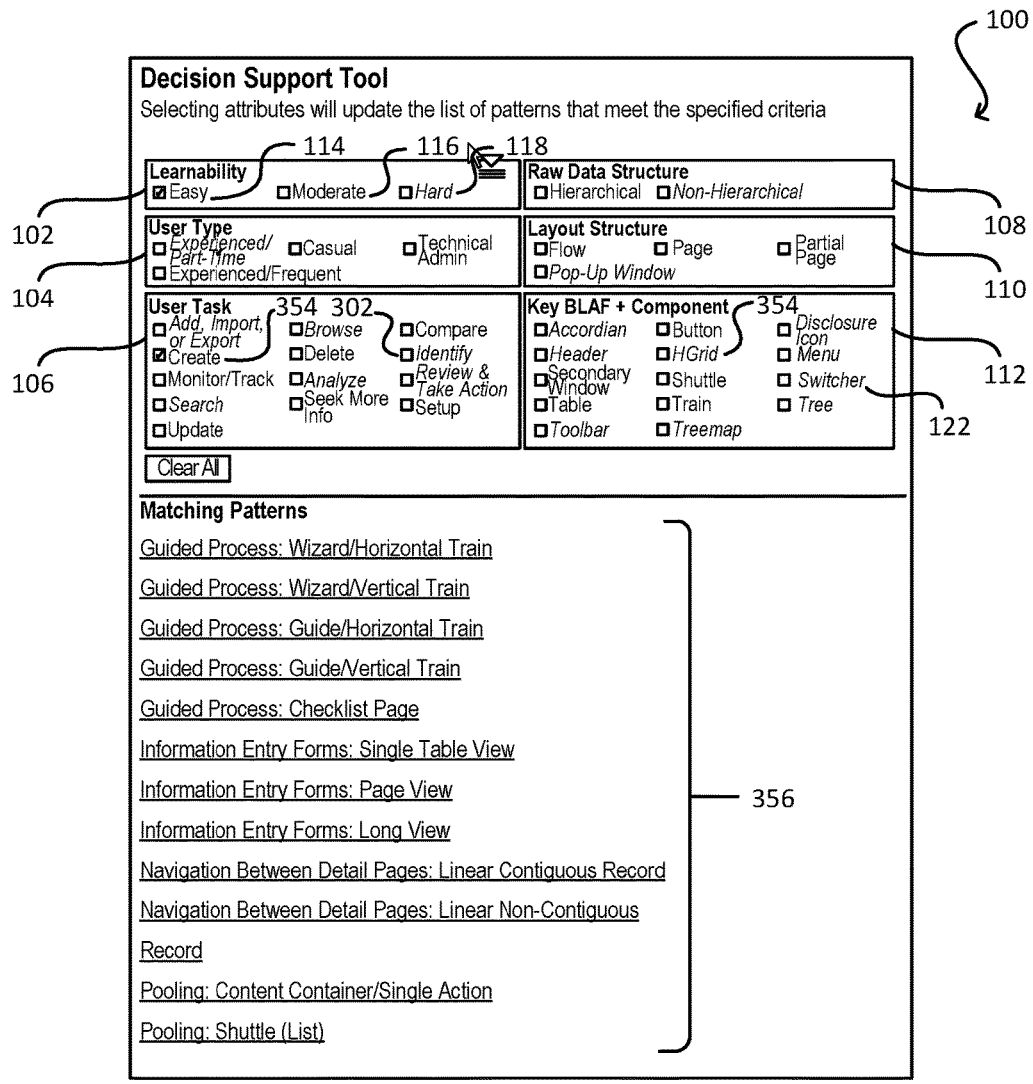

FIGS. 3A and 3B illustrate the visual state of user interface 100 after one or more choices have been selected. For example, in FIG. 3A, the choice "Easy" (114) under the "Learnability" facet (102) has been selected. As a result, a number of other choices, including "Hard" (118) under the "Learnability" facet (102) and "Identify" (302) under the "User Task" facet (106) have become disabled. In FIG. 3A, choices 118 and 302 are shown to be disabled by appearing "faded." The disabled state of a choice may also be shown by other indicators, such as color, size, text, and the like.

Furthermore, result set 304 has been updated to reflect those results that map to selected choice 114. As can be seen, the result set of the decision space has been pruned from 40 (see result set 120 of FIG. 1) to 24 results.

In FIG. 3B, a second choice "Create" (352) has been selected. In response, additional choices such as "HGrid" (354) under the "Key BLAF +Component" facet (112) have been disabled. Result set 356 has also been narrowed down to 12 results. Thus, a user is able to interactively view how the decision space and result set change as choices are selected.

Figure 4:
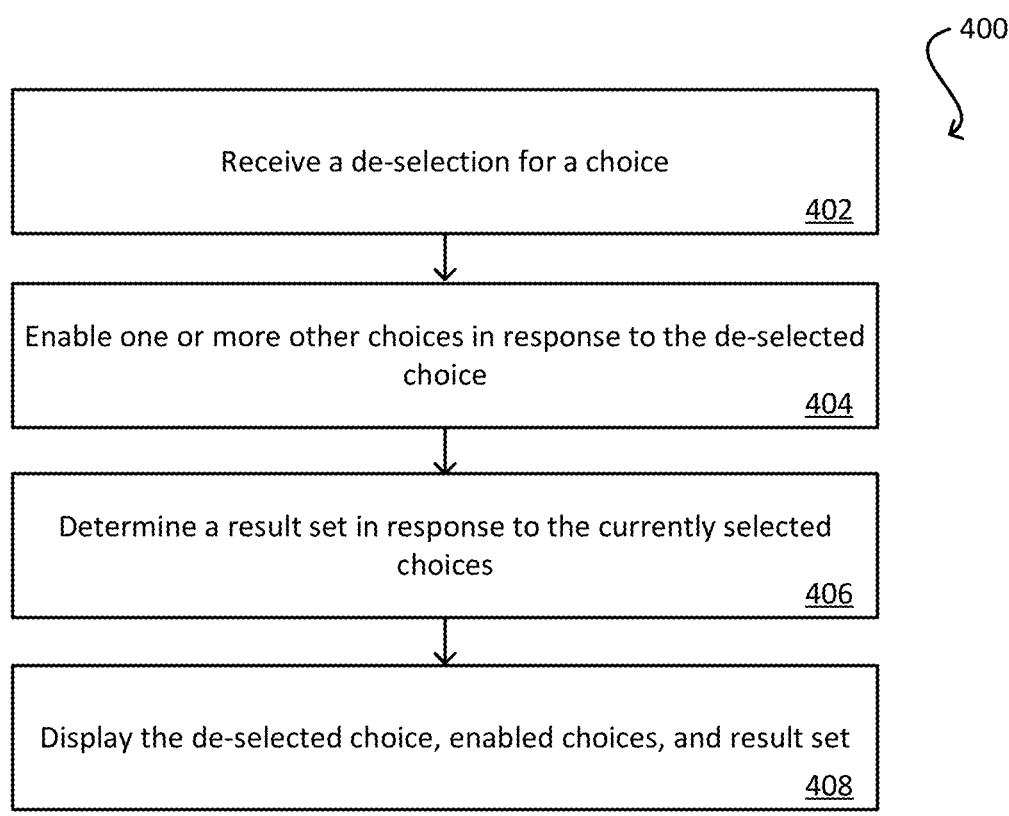
FIG. 4 illustrates the steps performed in processing a choice de-selection in accordance with one embodiment of the present invention.

FIG. 4 illustrates a flowchart of the steps performed in processing a choice de-selection. A "de-selection" occurs when a user unselects a choice that was previously selected. De-selection allows a user to "backtrack" through the decision space by revoking a choice that was made. The user interface of the faceted browser is accordingly updated in real-time to reflect the state of the decision space and the result set immediately prior to the selection of the de-selected choice.

At step 402, a de-selection for a choice is received. At step 404, one or more other choices are enabled in response to the de-selected choice. The choices that are enabled at step 404 may correspond to those choices that were disabled as a result of the previous selection of the de-selected choice. For example, in FIG. 3B, choice 354 was disabled in response to the selection of choice 352. Thus, if choice 352 is subsequently de-selected, choice 354 would become enabled again.

In various embodiments, a current result set is determined in response to the de-selected choice (406). The new result set corresponds to those results that map to the remaining selected choices. In one embodiment, the result sets of previous combinations of selected choices may be cached. Thus, if a de-selection results in a previously encountered combination of selected choices (i.e., location in the decision space), the corresponding result set may be retrieved from the cache rather than being calculated again.

At step 408, the user interface interactively displays the de-selected choice, enabled choice(s), and the result set. That is, the user interface is updated in real-time to reflect the de-selected state of the de-selected choice, the enabled state(s) of the enabled choice(s), and the size and content of the newly-determined (or cached) result set. Returning to FIG. 3B, if choice 352 were de-selected, the state of user interface 100 would be updated in real-time to appear as it does in FIG. 3A (the state immediately prior to the selection of choice 352).

Notably, choices do not have to be de-selected in the reverse order in which they were originally selected. For example, although the sequence of FIG. 3A and FIG. 3B illustrates that choice 352 was selected after choice 114, choice 114 may be de-selected without first de-selecting choice 352. In this situation, user interface 100 would be updated in real-time to reflect a decision space and result set in which only choice 352 is selected. Thus, users are not limited to backtracking along a previously navigated path; users may navigate to unexplored parts of the decision space by de-selecting a choice.

Because the terminology for user interface attributes such as facet, choice, and result labels are often critical to the usability of a faceted browser, it is important that these attributes can be easily modified. Various embodiments of the present invention enable this functionality by automatically generating user interface 100 from one or more text-based lists. Since the lists are text-based and separate from the code of the faceted browser, non-programmers can edit aspects of the user interface without changing any program code. Additionally, different text-based lists may be created and maintained to re-use the faceted browser program engine in different decision-support scenarios.

FIGS. 5A and 5B illustrate two exemplary lists 500 and 550. List 500 defines facet labels, choice labels, and associations between facets and choices. For example, the facet (name) labeled "Learnability" is associated to three choices (attributes) labeled "Easy," Moderate," and "Hard" respectively. List 550 defines result labels, result URLs, and associations between results and facet-choice pairs. For example, the result (name) labeled "Approve Items" has the URL (link) "./approveitems/" and is associated to the facet-choice pairs (pairs) "User Task:Review & Take Action", "User Type:Experienced/Part Time", "User Type:Experienced/Frequent", "Raw Data Structure:Non-Hierarchical", "Layout Structure:Page", "Layout Structure:Partial Page", "Learnability:Easy", "Learnability:Moderate", "Key BLAF+Component:Menu." In the instant example, the result URL represents the HTTP target for the result's hyperlink, and the associations between a result and facet-choice pairs represent how the result maps to selected choices. In alternative embodiments, many other types of data may stored in the above lists such as rank, extended descriptions, and the like.

Lists 500 and 550 are specified in JAVASCRIPT® Object Literal Syntax (JSOLS). However, the lists may be specified in any standard (e.g., XML, SGML, etc.) or proprietary data description format. Furthermore, the content of lists 500 and 550 may be combined into a single list, or separated into multiple lists. The lists may be stored within the same file(s) as the program code for the faceted browser, or in one or more separate files. Additionally, the lists may be stored in database tables or any other storage format. One of ordinary skill in the art would recognize many variations, modifications, and alternatives.

Figure 6:
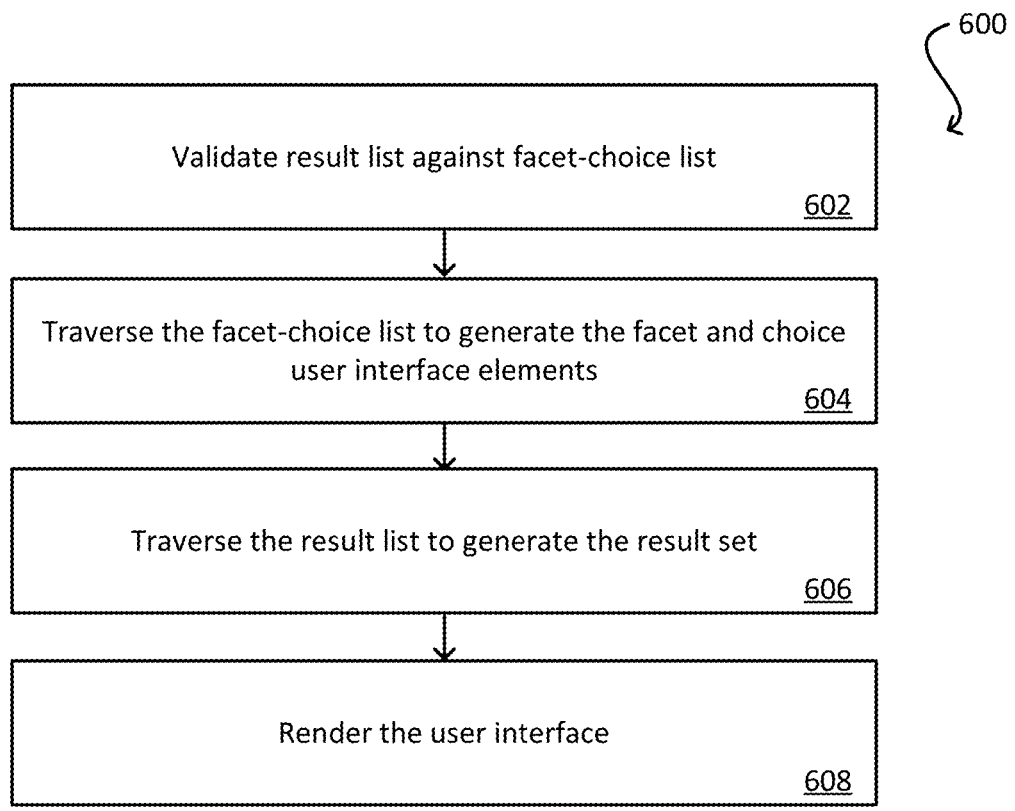
FIG. 6 illustrates the steps performed to generate a user interface in accordance with one embodiment of the present invention.

FIG. 6 depicts a flowchart of the steps performed in generating user interface 100 from lists 500 and 550. In various embodiments, the process may include validating result list 550 against facet-choice list 500 (602). In other words, the associations between results and facet-choice pairs defined in 550 are checked to ensure that each facet-choice pair is also defined in facet-choice list 500. In other embodiments, this step may be omitted entirely, or performed only once after list 500 or 550 is edited, rather than every time user interface 100 is generated.

The method also includes traversing the facet-choice list 500 to generate the facet and choice user interface elements (604), and traversing the result list 550 to generate the result set (606). In some embodiments, step 606 may be omitted if, for example, the user interface is begin generated for the first time in a user session, or if no choices have been selected. At step 608, the user interface is rendered and displayed to the user.

Figure 7:
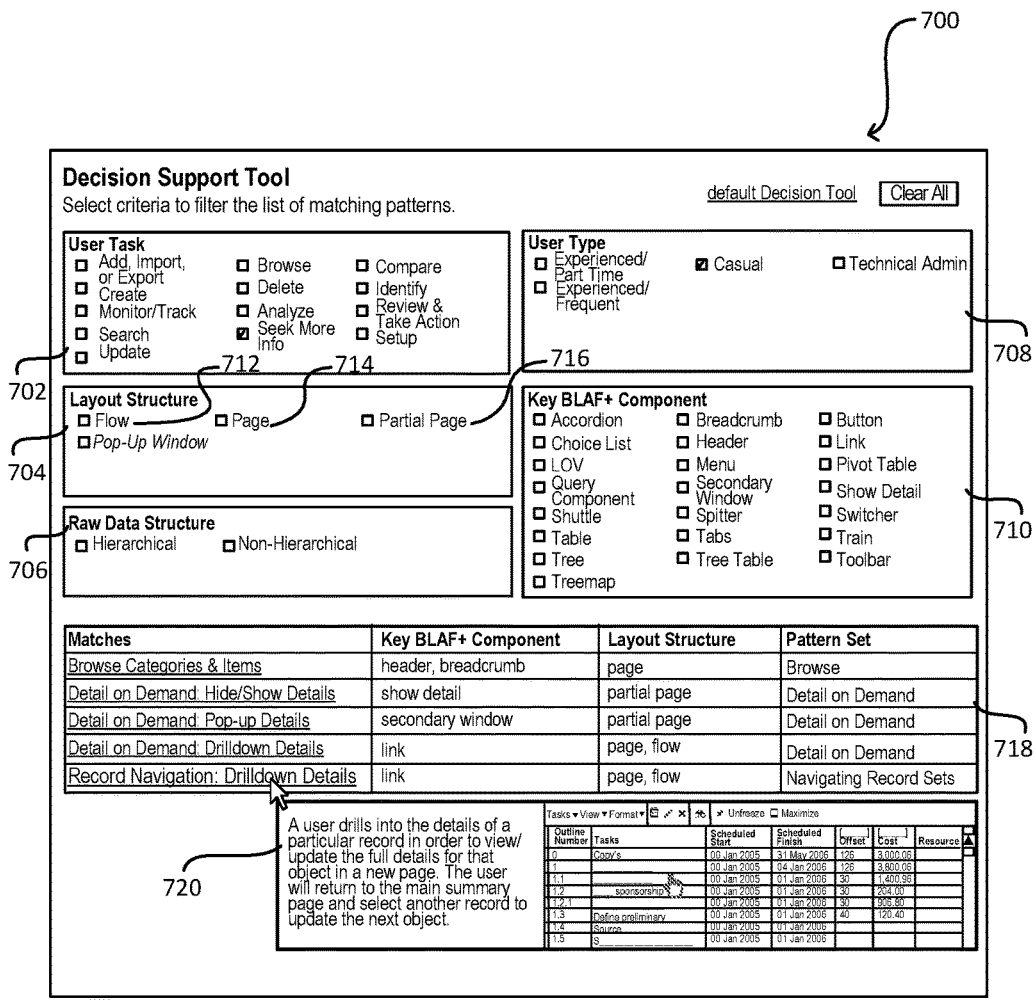
FIG. 7 illustrates a fourth exemplary user interface in accordance with one embodiment of the present invention.

Although embodiments of the present invention have been described with respect to user interface 100, many variations and modifications are contemplated. For example, FIG. 7 illustrates an alternative user interface 700. Like user interface 100, user interface 700 includes a plurality of facets (702, 704, 706, 708, 710), a plurality of choices (e.g., 712, 714, 716, etc.), and result set 718. However, user interface 700 also incorporates the concept of ranking facets 702, 704, 706, 708, 710 and providing a visual indication of facet ranks to the user. In some embodiments, facet ranks may be used to simply suggest a recommended starting point for pruning the decision space. In other embodiments, facet ranks may affect the content and/or order of results in result set 718. In the embodiment of FIG. 7, facet ranks are denoted by the color of the facet. Thus, facet 702 (red) has a higher or lower rank than facet 704 (blue). Similarly, facet 708 (red) has the same rank as facet 702 (red). Alternatively, other types of indicators may be used to denote rank, such as text labels, orientation/arrangement, size, and the like.

User interface 700 also displays a result set 718 that is more detailed than result set 120 of user interface 100. As shown, result set 718 is formatted as a table and includes additional information fields such as "Key BLAF +Component," "Layout Structure," and "Pattern Set." In various embodiments, any type of configuration and any number of information fields may be displayed. Furthermore, result set 718 utilizes a tool-tip function to display detailed information (720) about a highlighted result. The detailed information may contain text, images, hyperlinks, and the like. In some embodiments, the tool-tip function may also be used to display detailed information about facets and choices.

Embodiments of the present invention may be used in a variety of different decision-support scenarios. For example, the faceted browser of FIG. 7 may be used in a development context to aid developers in selecting design patterns for displaying data in a software application. Various embodiments may also be used in an Information Technology ("IT") context to aid administrators in installing and configuring applications. Yet other embodiments may be used in a customer-support context to aid customers in troubleshooting problems with purchased products. Still other embodiments may be used in a search context to aid users in finding resources across a public or private network (e.g., Internet, intranet, etc.). One of ordinary skill in the art would recognize many other uses.

One set of embodiments of the present invention may be used to replace conventional "wizards," which are single-hierarchy decision support tools. Thus, for example, various embodiments may be incorporated within a software application (e.g., JDEVELOPER®, MICROSOFT® WORD, MICROSOFT® EXCEL, etc.) or operating system (e.g., WINDOWS® , MAC OSX, UNIX, etc.) to support a user in using that piece of software. Other embodiments may be implemented as a standalone application. Additionally, embodiments of the present invention may be implemented to run as a distributed application across multiple computing devices (e.g., web-based client/server, proprietary client/ server, etc.), or as a non-distributed application running on a single computing device.

Figure 8:
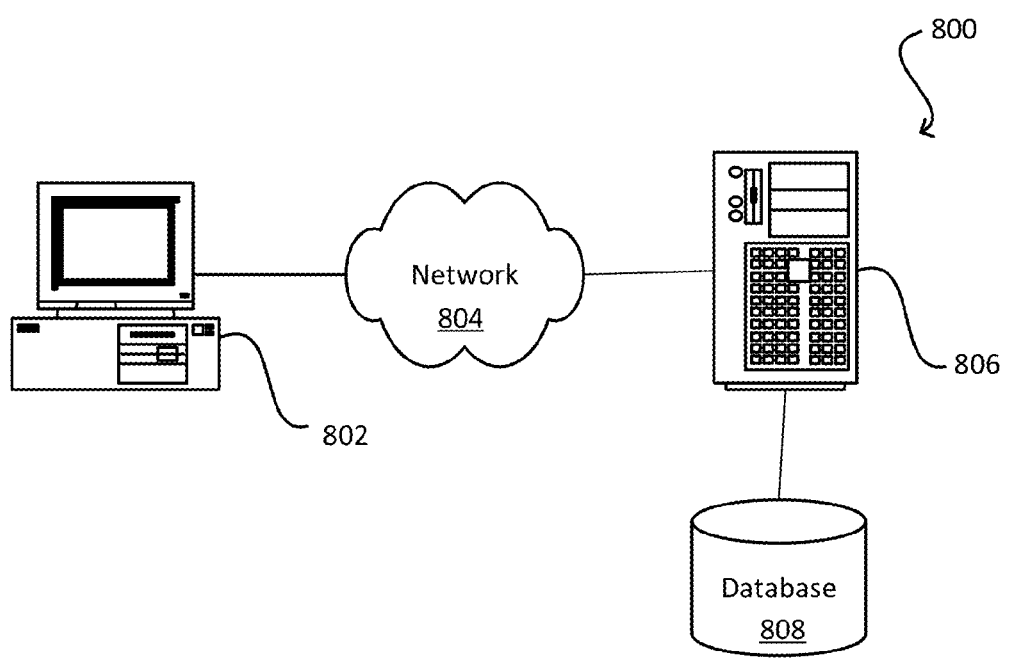
FIG. 8 illustrates an exemplary system that can be used in accordance with one embodiment of the present invention.

FIG. 8 illustrates an exemplary system in which various embodiments of the present invention may be implemented. System 800 includes a user computer 802, network 804, server computer 806, and database 808. User computer 802 may represent any type of computing device that incorporates an input component (e.g., keyboard, mouse, touch screen, etc.) and a display component (e.g., CRT or LCD monitor, etc.), such as a general purpose personal computer, cell phone, PDA, workstation computer, or the like. Server computer 806 may represent any type of server platform such as a specialized server system (e.g., PC servers, UNIX servers, mid-range servers, mainframe computers, rack-mounted servers, etc.), a server farm, a server cluster, or the like. One of ordinary skill in the art would recognize many, variations, modifications, and alternatives.

As mentioned above, some embodiments of the present invention may be implemented to run on a single computing device. Thus, user computer 802 may be configured to perform all of the functions of the faceted browser described herein. For example, computer 802 may be configured to execute a web browser or client application for displaying user interface 100, execute the faceted browser program code for processing user choice selections and de-selections, and access text-based lists 500 and 550 for generating user interface 100 and the result sets.

Other embodiments of the present invention may be implemented to run as a distributed application across multiple computing devices. As such, user computer 802 may be configured to interact with server computer 806 and database 808 via network 804 to perform the functions of the faceted browser described herein. According to one embodiment, server computer 808 executes the program code for generating user interface 100 and transmits a specification for the user interface to user computer 802. Computer 802 displays the user interface to the user and accepts input for choice selections or de-selections. The selections/de-selections are then transmitted to server computer 806, where code is executed to determine (1) which choices are to be enabled or disabled in response to the selections/de-selections, and (2) an updated result set. Finally, an updated specification of the user interface (reflecting the newly enabled/disabled choices and the updated result set) is sent to user computer 802 for display to the user. In some embodiments, the program code and data accessed by server computer 806 may be stored in an external database 808. In other embodiments, the code and/or data may be stored in any number of other local or networked storage devices such as Random Access Memory (RAM), flash memory, hard disk, optical disk, or the like. One of ordinary skill in the art would recognize many variations, modifications, and alternatives.

Figure 9:
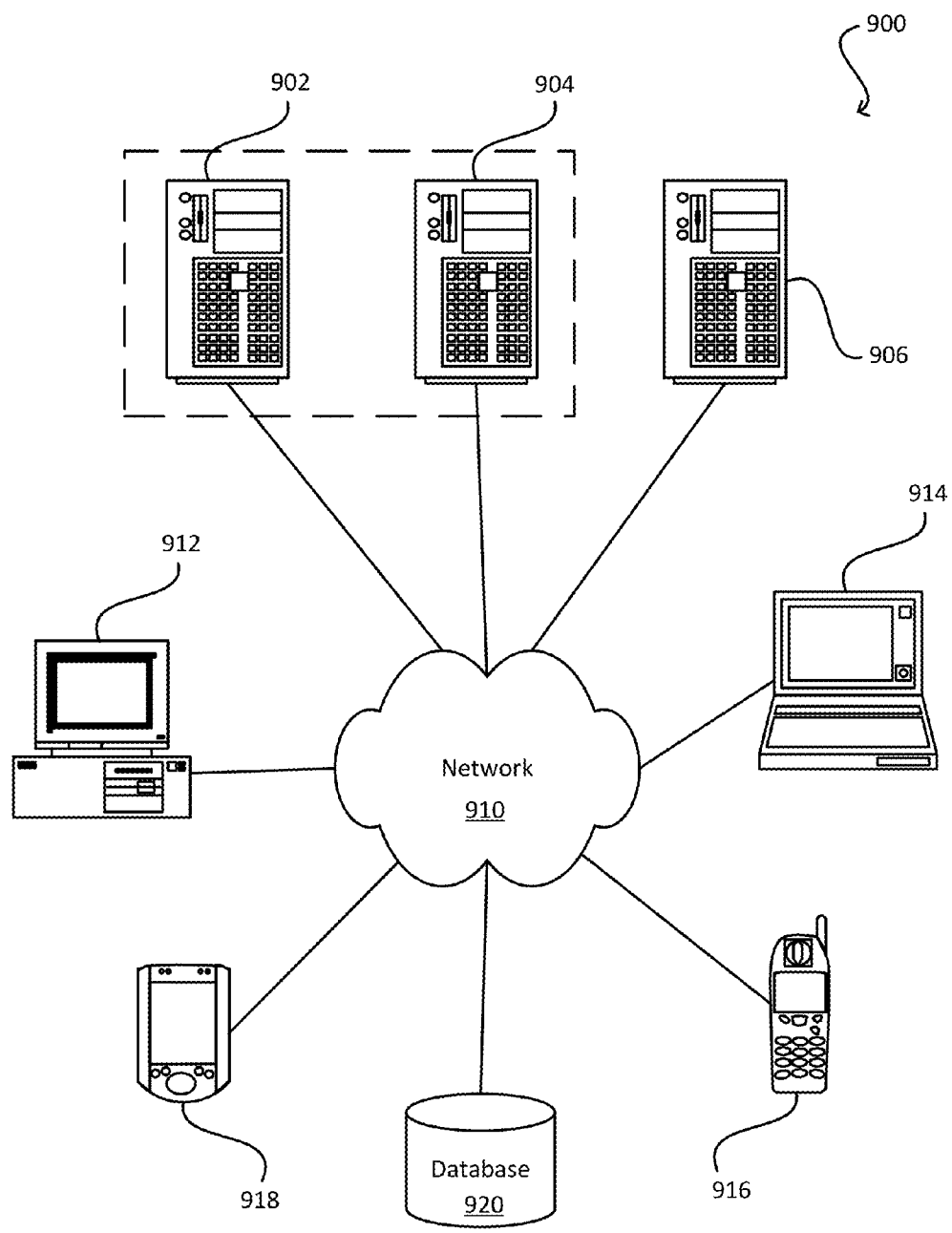
FIG. 9 illustrates components of a computer network that can be used in accordance with one embodiment of the present invention.

FIG. 9 is a block diagram illustrating components of an exemplary network environment in which various embodiments of the present invention may be implemented. The system 900 can include one or more user computers, computing devices, or processing devices 912, 914, 916, 918, which can be used to operate a client, such as a dedicated application, web browser, etc. The user computers 912, 914, 916, 918 can be general purpose personal computers (including, merely by way of example, personal computers and/or laptop computers running various versions of MICROSOFT WINDOWS® and/or APPLE MACINTOSH operating systems), cell phones or PDAs (running software such as MICROSOFT WINDOWS® MOBILE and being Internet, e-mail, SMS, BLACKBERRY, or other communication protocol enabled), and/or workstation computers running any of a variety of commercially-available UNIX or UNIX-like operating systems (including without limitation, the variety of GNU/LINUX operating systems). These user computers 912, 914, 916, 918 may also have any of a variety of applications, including one or more development systems, database client and/or server applications, and Web browser applications. Alternatively, the user computers 912, 914, 916, 918 may be any other electronic device, such as a thin-client computer, Internet-enabled gaming system, and/or personal messaging device, capable of communicating via a network (e.g., the network 910 described below) and/or displaying and navigating Web pages or other types of electronic documents. Although the exemplary system 900 is shown with four user computers, any number of user computers may be supported.

In most embodiments, the system 900 includes some type of network 910. The network may be any type of network familiar to those skilled in the art that can support data communications using any of a variety of commercially-available protocols, including without limitation TCP/IP, SNA, IPX, APPLETALK®, and the like. Merely by way of example, the network 510 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 902, 904, 906 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 906) may be dedicated to running applications, such as a business application, a Web server, application server, etc. Such servers may be used to process requests from user computers 912, 914, 916, 918. The applications can also include any number of applications for controlling access to resources of the servers 902, 904, 906.

The Web server can be running an operating system including any of those discussed above, as well as any commercially-available server operating systems. The Web server can also run any of a variety of server applications and/or mid-tier applications, including HTTP servers, FTP servers, CGI servers, database servers, JAVA® servers, business applications, and the like. The server(s) also may be one or more computers which can be capable of executing programs or scripts in response to the user computers 912, 914, 916, 918. As one example, a server may execute a Web application such as the faceted browser of the present invention. The Web application may be implemented as one or more scripts or programs written in any programming language, such as JAVA®, C, C# or C++, and/or any scripting language, such as JAVASCRIPT®, PERL®, PYTHON, or TCL, as well as combinations of any programming/scripting languages. The server(s) may also include database servers, including without limitation those commercially available from ORACLE®, MICROSOFT®, SYBASE®, IBM and the like, which can process requests from database clients running on a user computer 912, 914, 916, 918.

The system 900 may also include one or more databases 920. The database(s) 920 may reside in a variety of locations. By way of example, a database 920 may reside on a storage medium local to (and/or resident in) one or more of the computers 902, 904, 906, 912, 914, 916, 918. Alternatively, it may be remote from any or all of the computers 902, 904, 906, 912, 914, 916, 918, and/or in communication (e.g., via the network 910) with one or more of these. In a particular set of embodiments, the database 920 may reside in a storage-area network ("SAN") familiar to those skilled in the art. Similarly, any necessary files for performing the functions attributed to the computers 902, 904, 906, 912, 914, 916, 918 may be stored locally on the respective computer and/or remotely, as appropriate. In one set of embodiments, the database 920 may be a relational database, such as Oracle 10g, that is adapted to store, update, and retrieve data in response to SQL-formatted commands.

Figure 10:
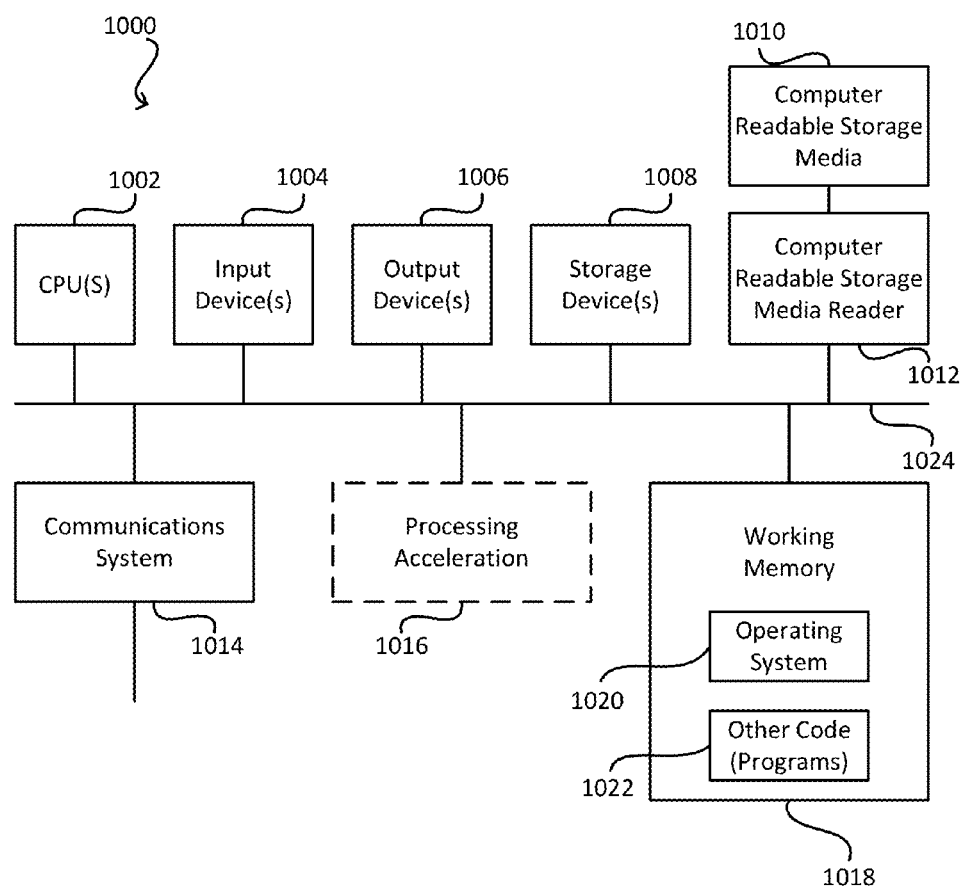
FIG. 10 illustrates components of a computerized device that can be used in accordance with one embodiment of the present invention.

FIG. 10 illustrates an exemplary computer system 1000, in which various embodiments of the present invention may be implemented. The system 1000 may be used to implement any of the computer systems described above. The computer system 1000 is shown comprising hardware elements that may be electrically coupled via a bus 1024. The hardware elements may include one or more central processing units (CPUs) 1002, one or more input devices 1004 (e.g., a mouse, a keyboard, etc.), and one or more output devices 1006 (e.g., a display device, a printer, etc.). The computer system 1000 may also include one or more storage devices 1008. By way of example, the storage device(s) 1008 can include devices such as disk drives, optical storage devices, solid-state storage device such as a random access memory ("RAM") and/or a read-only memory ("ROM"), which can be programmable, flash-updateable and/or the like.

The computer system 1000 may additionally include a computer-readable storage media reader 1012, a communications system 1014 (e.g., a modem, a network card (wireless or wired), an infra-red communication device, etc.), and working memory 1018, which may include RAM and ROM devices as described above. In some embodiments, the computer system 1000 may also include a processing acceleration unit 1016, which can include a digital signal processor DSP, a special-purpose processor, and/or the like.

The computer-readable storage media reader 1012 can further be connected to a computer-readable storage medium 1010, together (and, optionally, in combination with storage device(s) 1008) comprehensively representing remote, local, fixed, and/or removable storage devices plus storage media for temporarily and/or more permanently containing computer-readable information. The communications system 1014 may permit data to be exchanged with the network and/or any other computer described above with respect to the system 1000.

The computer system 1000 may also comprise software elements, shown as being currently located within a working memory 1018, including an operating system 1020 and/or other code 1022, such as an application program (which may be a client application, Web browser, mid-tier application, RDBMS, etc.). It should be appreciated that alternate embodiments of a computer system 1000 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. One or more non-transitory computer-readable media storing computer-executable instructions that, when executed by one or more processors, cause the one or more processors to:
    generate a first list, the first list comprising a first label for a feature, a second label for a user selection associated with the feature, and a plurality of feature-selection pairs, each feature-selection pair of the plurality of feature-selection pairs defining a first association between the first label and the second label;
    generate a second list, the second list comprising a third label for a result, a Uniform Resource Locator associated with the result, and a second association between the third label and a feature-selection pair of the plurality of feature-selection pairs;
    validate the second list against the first list by identifying that the first association defined by each feature-selection pair in the second list is in the first list;
    after validating the second list against the first list, traverse the first list to generate a plurality of user interface elements based at least in part on the validation; and
    generate a user interface based at least in part on the first label for each feature in the first list, the second label for each user selection associated with each feature in the first list, and the third label for each result in the second list, the user interface comprising a plurality of features that each comprise the plurality of user interface elements, the first list and the second list generated independently from program code that is used for generating the user interface.

2. The computer-readable media of claim 1, wherein each feature of the plurality of features corresponds to a dimension to be considered in making a decision.

3. The computer-readable media of claim 1, wherein the plurality of user interface elements correspond to a plurality of check box elements in the user interface.

4. The computer-readable media of claim 1, wherein the computer-executable instructions further comprise instructions that cause the one or more processors to receive, from a user, a selection of a first user interface element in the user interface, wherein the first user interface element is part of a first feature in the plurality of features.

5. The computer-readable media of claim 4, wherein the computer-executable instructions further comprise instructions that cause the one or more processors to disable a second user interface element when selection of the second user interface element does not narrow a first result set of possible final decisions corresponding to the selection of the first user interface element received from the user.

6. The computer-readable media of claim 5, wherein the computer-executable instructions further comprise instructions that cause the one or more processors to determine the first result set of possible final decisions in response to the selection of the first user interface element and the disabling of the second user interface element.

7. The computer-readable media of claim 6, wherein the computer-executable instructions further comprise instructions that cause the one or more processors to update the user interface to display a selected status of the first user interface element, a disabled status of the second user interface element, and the first result set to the user.

8. The computer-readable media of claim 1, wherein the user interface is presented in a web browser, wherein each result in a first result set is presented as a hypertext link, and wherein a user interface element of the plurality of user interface elements comprises at least one of a checkbox, a button, or a drop-down list.

9. The computer-readable media of claim 1, wherein the computer-executable instructions further comprise instructions that cause the one or more processors to:
receive a selection of a third user interface element in the user interface; and
disable a fourth user interface element in the user interface in response to the selection of the third user interface element, wherein the fourth user interface element cannot be selected by a user.

10. The computer-readable media of claim 9, wherein the computer-executable instructions further comprise instructions that cause the one or more processors to:
determine, a second result set of possible final decisions in response to the selection of the third user interface element; and
update the user interface to display a selected status of the third user interface element, a disabled status of the fourth user interface element, and the second result set to the user.

11. The computer-readable media of claim 9, wherein the computer-executable instructions further comprise instructions that cause the one or more processors to:
receive a de-selection of the third user interface element;
enable the disabled fourth user interface element in response to the de-selection; and
update the user interface to display the third user interface element and the fourth user interface element in a current state resulting from the de-selection, along with an updated result set, to the user.

12. The computer-readable media of claim 1, further comprising storing the first list and the second list in a text-based file, wherein the text-based file does not contain the program code for generating the user interface.

13. The computer-readable media of claim 12, wherein the computer-executable instructions further comprise instructions that cause the one or more processors to generate the user interface based at least in part on the text-based file.

14. The computer-readable media of claim 1, wherein the computer-executable instructions further comprise instructions that cause the one or more processors to:
define a ranking for each feature in the plurality of features; and
present a visual indication of the ranking for each feature in the user interface.

15. The computer-readable media of claim 14, wherein the visual indication of the ranking for each feature in the user interface is denoted by a color of the feature.

16. The computer-readable media of claim 14, wherein the visual indication of the ranking for each feature in the user interface is denoted by an orientation of the feature in the user interface.

17. The computer-readable media of claim 14, wherein the computer-executable instructions further comprise instructions that cause the one or more processors to determine an order of results in a result set displayed in the user interface based at least in part on the ranking for each feature in the plurality of features.

18. The computer-readable media of claim 17, wherein the computer-executable instructions further comprise instructions that cause the one or more processors to display additional information related to a feature or a user selection associated with a feature in the result set, the additional information comprising at least one of component information, layout structure information, or pattern set information related to the feature or the user selection associated with the feature.

19. A computer-implemented method comprising:
generating, by a computer system, a first list, the first list comprising a first label for a feature, a second label for a user selection associated with the feature, and a plurality of feature-selection pairs, each feature-selection pair of the plurality of feature-selection pairs defining a first association between the first label and the second label;
generating, by the computer system, a second list, the second list comprising a third label for a result, a Uniform Resource Locator associated with the result, and a second association between the third label and a feature-selection pair of the plurality of feature-selection pairs;
validating, by the computer system, the second list against the first list by identifying that the first association defined by each feature-selection pair in the second list is in the first list;
after validating the second list against the first list, traverse, by the computer system, the first list to generate a plurality of user interface elements based at least in part on the validation; and
generating, by the computer system, a user interface based at least in part on the first label for each feature in the first list, the second label for a user selection associated with each feature in the first list, and the third label for each result in the second list, the user interface comprising a plurality of features that each comprise the plurality of user interface elements, the first list and the second list generated independently from program code that is used for generating the user interface.

20. A system comprising:
memory configured to store computer-executable instructions; and
at least one processor configured to access the memory and execute the computer-executable instructions to collectively at least:
generate a first list, the first list comprising a first label for a feature, a second label for a user selection associated with the feature, and a plurality of feature-selection pairs, each feature-selection pair of the plurality of feature-selection pairs defining a first association between the first label and the second label;
generate a second list, the second list comprising a third label for a result, a Uniform Resource Locator associated with the result, and a second association between the third label and a feature-selection pair of the plurality of feature-selection pairs;

validate the second list against the first list by identifying that the first association defined by each feature-selection pair in the second list is in the first list;

after validating the second list against the first list, traverse the first list to generate a plurality of user interface elements based at least in part on the validation; and generate a user interface based at least in part on the first label for each feature in the first list, the second label for a user selection associated with each feature in the first list, and the third label for each result in the second list, the user interface comprising a plurality of features that each comprise the plurality of user interface elements, the first list and the second list generated independently from program code that is used for generating the user interface.

* * * * *

UNITED STATES PATENT AND TRADEMARK OFFICE
CERTIFICATE OF CORRECTION

PATENT NO. : 10,360,504 B2
APPLICATION NO. : 15/203578
DATED : July 23, 2019
INVENTOR(S) : Helfman et al.

Page 1 of 1

It is certified that error appears in the above-identified patent and that said Letters Patent is hereby corrected as shown below:

In the Specification

In Column 1, Line 40, delete "typical1" and insert -- typical --, therefor.

In Column 2, Line 58, delete "XML," and insert -- XML --, therefor.

In Column 8, Line 52, delete "WINDOWS® ," and insert -- WINDOWS®, --, therefor.

In Column 10, Line 12, delete "APPLETALK® ," and insert -- APPLETALK®, --, therefor.

In Column 10, Line 54, delete "ORACLE® ," and insert -- ORACLE®, --, therefor.

In Column 10, Lines 54-55, delete "MICROSOFT® ," and insert -- MICROSOFT®, --, therefor.

In Column 10, Line 55, delete "SYBASE® ," and insert -- SYBASE®, --, therefor.

Signed and Sealed this
Fourth Day of August, 2020

Andrei Iancu
*Director of the United States Patent and Trademark Office*